Figure 1:
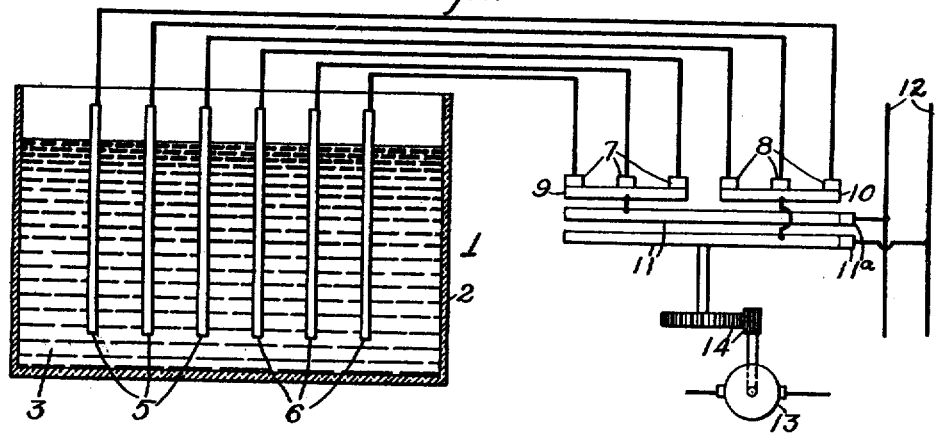

J. SLEPIAN.
ELECTROLYTIC CONDENSER.
APPLICATION FILED DEC. 30, 1919.

1,395,304.

Patented Nov. 1, 1921.

WITNESSES:
J. A. Helsel
O. E. Bee.

INVENTOR
Joseph Slepian.
BY
Wesley G. Carr
ATTORNEY

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTROLYTIC CONDENSER.

1,395,304.  Specification of Letters Patent.  Patented Nov. 1, 1921.

Application filed December 30, 1919. Serial No. 348,449.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Electrolytic Condensers, of which the following is a specification.

My invention relates to electrolytic condensers and, more particularly, to condensers of the type formed by immersing a plurality of film-forming electrodes in a suitable electrolyte. The primary object of my invention is the provision of condensers of the above designated type which shall insure satisfactory power-factor correction under continuous operating conditions.

I have found that an electrolytic condenser has a tendency to take more voltage between one electrode and the electrolyte than between the other electrode and the electrolyte. This condition obtains because the capacity of an electrode varies in an inverse manner with the voltage under which it is operating so that the condition of equal-voltage division between the electrolyte and the respective electrodes is somewhat unstable. Such instability is, of course, undesirable, particularly when a condenser is connected in a power circuit where it is inconvenient to give it constant attention.

One object of my invention, therefore, resides in the construction of a condenser in which stable voltage conditions shall obtain and, consequently, good operating characteristics for power-factor correction.

A still further object of my invention is the construction of electrolytic condensers which shall have good operating characteristics but which shall be relatively simple in construction and, consequently, inexpensive to manufacture.

With these and other objects in view, my invention will be more fully described, illustrated in the drawings, in the several views of which corresponding numerals indicate like parts, and then particularly pointed out in the claims.

Figure 2:
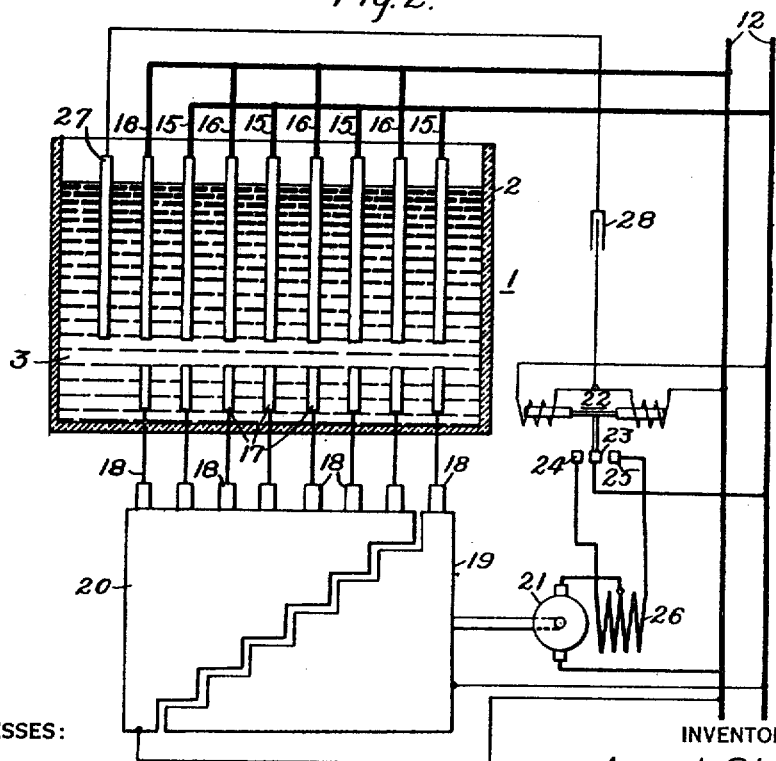

In the drawings, Figure 1 is a diagrammatic view of a condenser provided with means for maintaining equal-voltage division between the electrodes and the electrolyte, and Fig. 2 is a similar view illustrating a modification of my invention.

It is, of course, apparent that any means, which is not too complicated or expensive, for establishing good operating characteristics in a condenser is highly desirable to promote the commercial application of such apparatus. In order to provide a condenser structure in which stable voltage conditions shall obtain, I may construct the condenser by employing a plurality of electrodes and by providing means for selectively connecting them in two groups, each group serving as one compound electrode. I also provide means for so changing the selective grouping of the individual electrodes at regular intervals that all of the individual electrodes shall be formed and kept formed by the same alternating potential, relative to the solution or electrolyte, thereby insuring proper division of the voltage.

I may employ a modified form of my invention which embodies the broad principles above advanced by utilizing a plurality of auxiliary electrodes, which may be connected in sequence to the groups of main electrodes to increase the capacity of the electrodes which have a higher potential relative to the electrolyte. By increasing the capacity of the electrodes having the higher potential relative to the electrolyte, their potential is reduced to that of the other electrodes, thereby establishing stable operating conditions.

In Fig. 1 is shown one form of my invention comprising an electrolytic condenser 1 which includes a liquid-containing tank 2, an electrolyte 3 and a plurality of electrodes divided into two groups 5 and 6. The electrodes of the two groups are individually connected to a plurality of contact members 7 and 8, respectively, which engage contact strips 9 and 10 mounted upon a suitable rotatable drum or cylinder. The contact strips 9 and 10 are connected to other contact plates 11, which are, in turn, connected, through brushes 11ª, to a supply circuit 12. The drum that carries the various contact members is shown in developed form in the drawings, in order to clearly illustrate the connections, and it may be rotated by a suitable motor 13 connected thereto through reduction gear wheels 14.

In the position of the drum shown in Fig. 1, the electrodes 5 are connected to the contact members 7, which engage the contact strip 9 and the electrodes 6 are connected to the contact members 8, which engage the contact strip 10. In order to insure equal-voltage division between the electrodes and the electrolyte, the contact strips 9 and 10 may be so moved as to successively engage the various contact members 7 and 8, thereby connecting the individual electrodes in various groups. It will be appreciated that, by changing the grouping of the individual electrodes, forming the compound electrode, those having a higher potential with respect to the electrolyte will be successively connected to the group having the lower potential.

Although the above described condenser and method of obtaining equal-voltage division is satisfactory, I may embody the same principles in a slightly modified form of structure in which the voltage division is obtained in a slightly different manner. As shown in Fig. 2, one main group of electrodes 15 is connected to one side of the supply circuit 12 and another group 16 is connected to the other side thereof. A plurality of auxiliary electrodes 17, which are preferably of less area than the main electrodes, are respectively connected to a series of contact members 18 that are adapted to engage drum control segments 19 and 20. The control segments 19 and 20 are connected to opposite sides of the supply circuit 12, and a suitable reversing motor 21 is mechanically connected to rotate the control segments.

In order to provide for reversing the direction of travel of the control segments, I employ a differential relay 22 which actuates, when unbalanced, an arm carrying a contact member 23, which is connected to one side of the supply circuit 12. The contact member 23 is adapted to engage either of a plurality of contact members 24 and 25 which are connected to the ends of a series field winding 26 of the motor 21. The central point of the field winding 26 is connected to one terminal of the armature of the motor 21 and the other terminal thereof is connected to the opposite side of the supply circuit from that to which the contact member 23 is connected. The coils of the differential relay 22 are connected to the supply circuit, and a non-film-forming electrode 27 is connected, through a condenser 28, to a point between the said coils.

The position of the various elements of the structure shown in Fig. 2 represents an extreme condition but it may occur when the groups of electrodes 15 and 16 have substantially the same potential, relative to the electrolyte. The contact fingers 18, which are connected to the auxiliary electrodes 17, engage the developed control segments 19 and 20 and are, therefore, connected to the main electrodes 15 and 16.

When one group of electrodes takes a higher potential with respect to the electrolyte, one of the coils of the differential relay 22 actuates the contact member 23 to close the circuit through the reversing motor 21, thereby causing the control segments 19 and 20 to be moved into engagement with the auxiliary electrodes which are connected to the plates having the higher potential. The capacity of the plates having the higher potential, is thus increased, which tends to reduce their potential to that of the other electrodes, with respect to the electrolyte. When the coils of the differential relay 22 are energized to a different degree, the current traverses the circuit established through the non-film-forming electrode 27 and this current is confined to alternating current by means of the condenser 28. It will be apparent that the direction of rotation of the control segments 19 and 20 depends upon which of the coils of the differential relay is energized to the greater degree, and such unbalancing depends upon which group of electrodes 15 and 16 takes a higher potential with respect to the electrolyte. It will be appreciated, therefore, that the control segments 19 and 20 will be moved into position to connect the auxiliary electrodes to the main electrodes taking the higher potential, which will always tend to maintain an equal division of voltage in the condenser.

The only material difference between the construction shown in Fig. 1 and that shown in Fig. 2 is that the grouping of the plates of the condenser in Fig. 1 is continuously changed while that in Fig. 2 remains constant, and auxiliary electrodes are employed to increase the plate area only when an unbalancing or an unequal division of voltage obtains in the cell.

Although I have shown and specifically described a plurality of condenser structures which may be constructed in accordance with my invention, it is obvious that minor changes may be made within the spirit and scope of my invention to provide other condenser structures embodying the principles of continuous operation, and I desire, therefore, that no limitations shall be imposed except such as are indicated in the appended claims.

I claim as my invention:—

1. The combination with an electrolytic condenser comprising a plurality of groups of electrodes and a coöperating electrolyte, of means governed by the relative voltages impressed upon the groups of electrodes acting to maintain the potential of the groups of electrodes substantially equal with respect to the electrolyte.

2. The combination with an electrolytic condenser comprising a plurality of electrodes arrranged in two groups and a coöperating electrolyte, of means for so changing the connections of the individual electrodes as to successively connect them in different groups.

3. The combination with an electrolytic condenser comprising a plurality of electrodes arranged in two groups and a coöperating electrolyte, of means, governed by the relative voltages of the electrodes with respect to the electrolyte, acting to increase the capacity of one of the groups when the voltages of the groups with respect to the electrolyte are unequal.

4. The combination with an electrolytic condenser comprising a plurality of film-forming electrodes connected in two groups and a coöperating electrolyte, of means for changing the connection of the individual electrodes in the groups at regular intervals.

5. The combination with an electrolytic condenser comprising a plurality of main electrodes connected in two groups, a plurality of auxiliary electrodes and a coöperating electrolyte, of means for connecting the auxiliary electrodes to either group of the main electrodes, said means including a differential relay so connected as to be actuated when the voltages of the two groups of main electrodes with respect to the electrolyte are unequal.

6. The combination with an electrolytic condenser comprising two groups of main electrodes, a plurality of auxiliary electrodes of less area than the main electrodes and a coöperating electrolyte, of means for successively connecting the auxiliary electrodes to one group of the main electrodes when its potential with respect to the electrolyte is higher than the other group.

7. The combination with an electrolytic condenser comprising two groups of main electrodes, a plurality of auxiliary electrodes of less area than the main electrodes, and a coöperating electrolyte, of a control drum having segments connected to the auxiliary electrodes and to the main electrodes, and means for so rotating the control drum as to successively connect the auxiliary electrodes to the groups of main electrodes.

8. The combination with an electrolytic condenser comprising two groups of main electrodes and a coöperating electrolyte, of electrodes and a coöperating electrolyte, of a control drum having segments connected to the main electrodes and to a supply circuit, and means for so moving the control drum as to interchange the electrodes connected in the two groups.

In testimony whereof, I have hereunto subscribed my name this 23rd day of December, 1919.

JOSEPH SLEPIAN.